United States Patent [19]
Tucek

[11] 3,910,326
[45] Oct. 7, 1975

[54] TREE HARVESTING APPARATUS WITH ACCUMULATOR MECHANISM

[75] Inventor: Frank J. Tucek, Wausau, Wis.

[73] Assignee: J. I. Case Company, Racine, Wis.

[22] Filed: Oct. 29, 1974

[21] Appl. No.: 518,771

[52] U.S. Cl. .................. 144/34 R; 91/412; 91/448; 91/459; 144/3 D; 144/34 E; 294/106
[51] Int. Cl.² .................... A01G 23/08; F15B 15/02
[58] Field of Search .......... 294/106; 83/102.1, 928; 91/412, 459, 448; 144/2 Z, 3 D, 34 E, 309 AC, 34 R

[56] References Cited
UNITED STATES PATENTS

| | | | |
|---|---|---|---|
| 3,014,345 | 12/1961 | Green | 91/412 |
| 3,487,864 | 1/1970 | Larson et al. | 144/3 D |
| 3,601,169 | 8/1971 | Hamilton | 144/3 D X |
| 3,631,762 | 1/1972 | Fuzzell | 91/459 X |
| 3,664,391 | 5/1972 | Coffey | 83/102.1 |
| 3,727,653 | 4/1973 | Tucek | 144/34 R X |
| 3,742,991 | 7/1973 | McColl | 144/3 D |
| 3,795,264 | 3/1974 | Coughran, Jr. | 144/3 D |
| 3,805,860 | 4/1974 | Smith | 144/34 R X |
| 3,826,295 | 7/1974 | Johnson et al. | 144/3 D X |

*Primary Examiner*—Donald R. Schran
*Assistant Examiner*—W. D. Bray
*Attorney, Agent, or Firm*—Dressler, Goldsmith, Clement & Gordon, Ltd.

[57] ABSTRACT

A tree harvesting apparatus consisting of a rigid support with grapple means pivotally supported on the support and tree cutting means for severing the tree that is being grasped by the grapple means. The tree harvesting apparatus also includes an accumulator mechanism consisting of spaced fixed tree engaging elements on the support and a gripping member pivoted on the support between the tree engaging elements. The gripping member includes a first portion pivoted on the support means and a second portion pivoted on the outer end of the first portion with biasing means normally maintaining the portions in end-to-end relation. A single drive member cooperates with the first portion and the support for moving the portions as a unit between clamped and released positions to accumulate trees between the gripping member and the spaced fixed elements. The apparatus also incorporates a hydraulic circuit which is designed so that only two conduits lead from the remote hydraulic source to the rigid support and branch conduits connect the main conduits to the hydraulically actuated gripping member. The branch conduits incorporate a solenoid operated valve which is normally in a position that locates the gripping member in a position where the harvesting apparatus can be utilized without accumulating trees. The solenoid valve is remotely controlled so that the operator may at any time accumulate trees by temporarily activating the solenoid operated valve.

10 Claims, 5 Drawing Figures

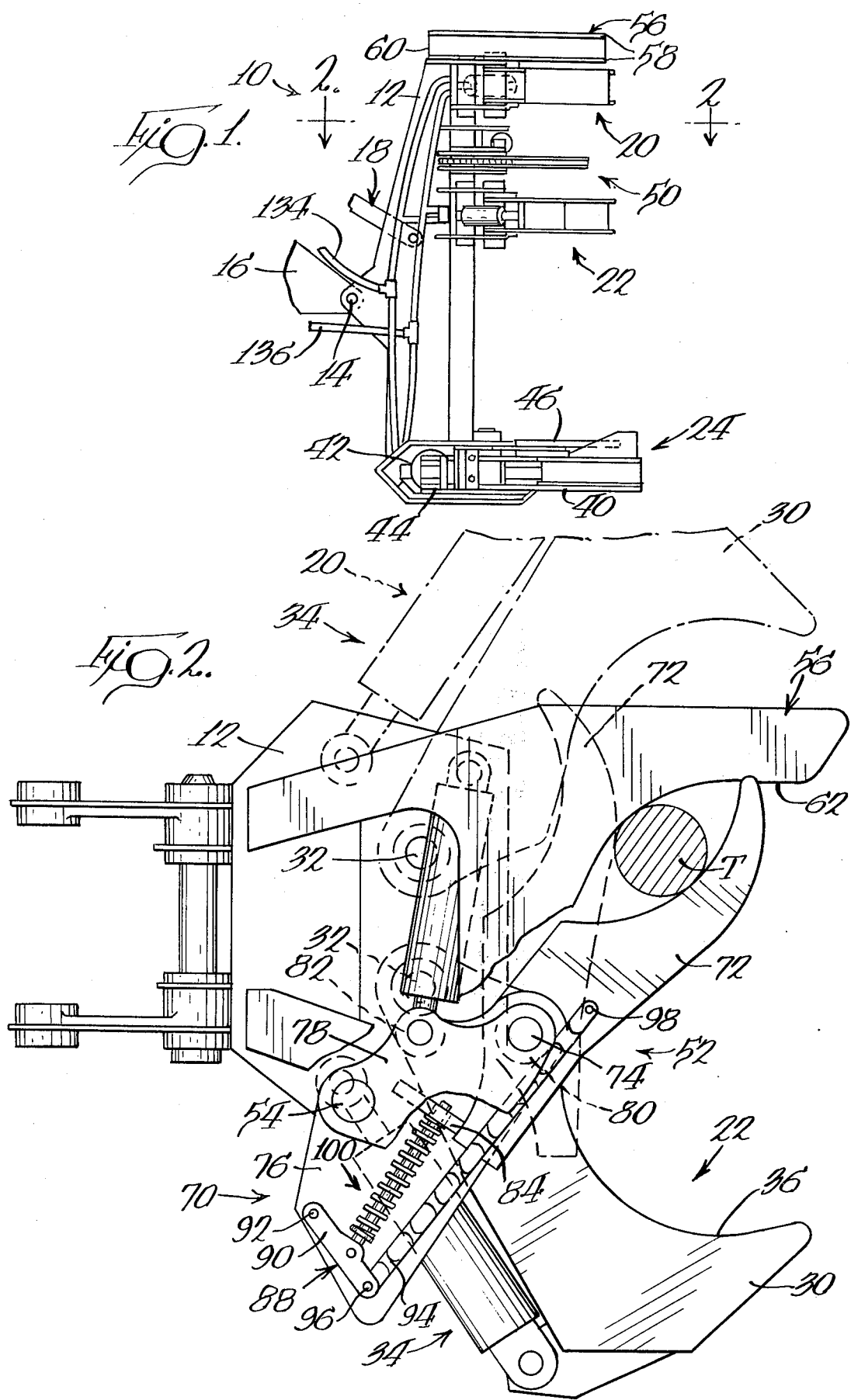

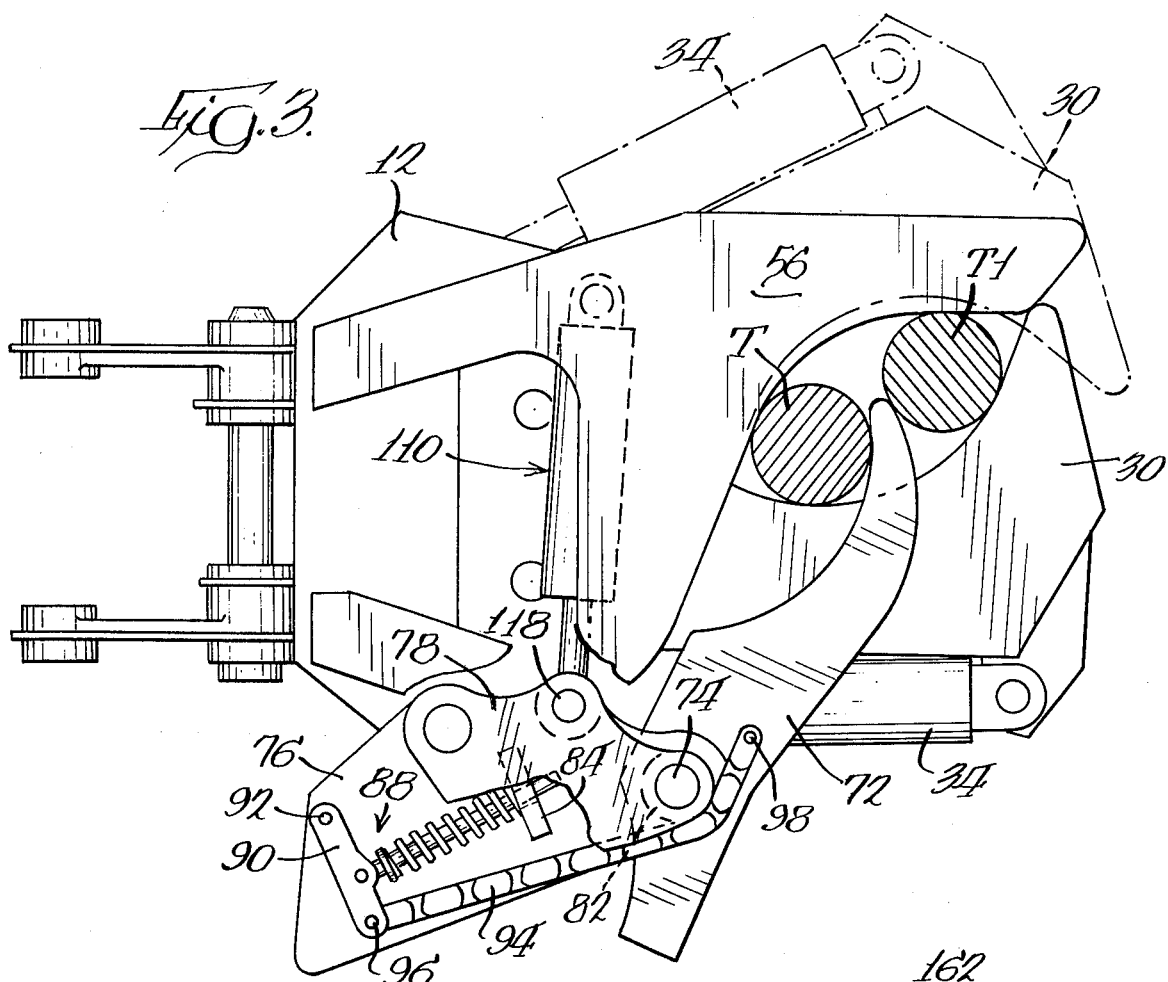
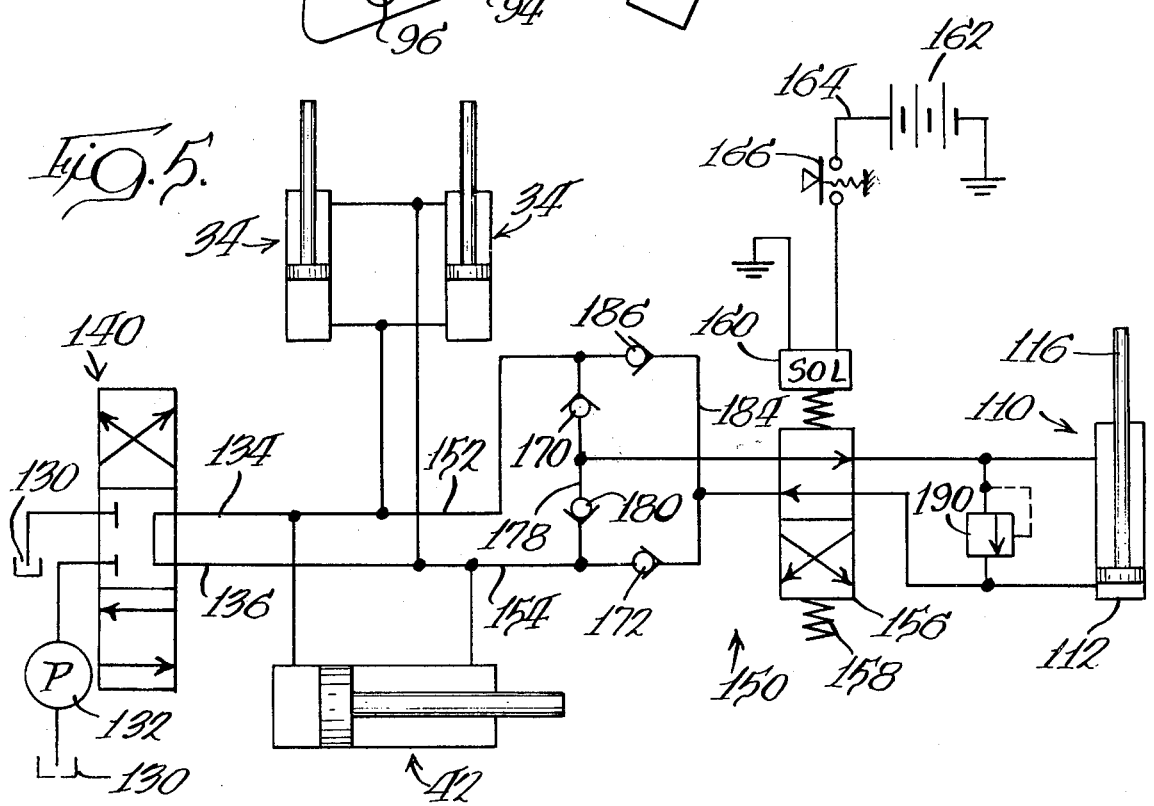

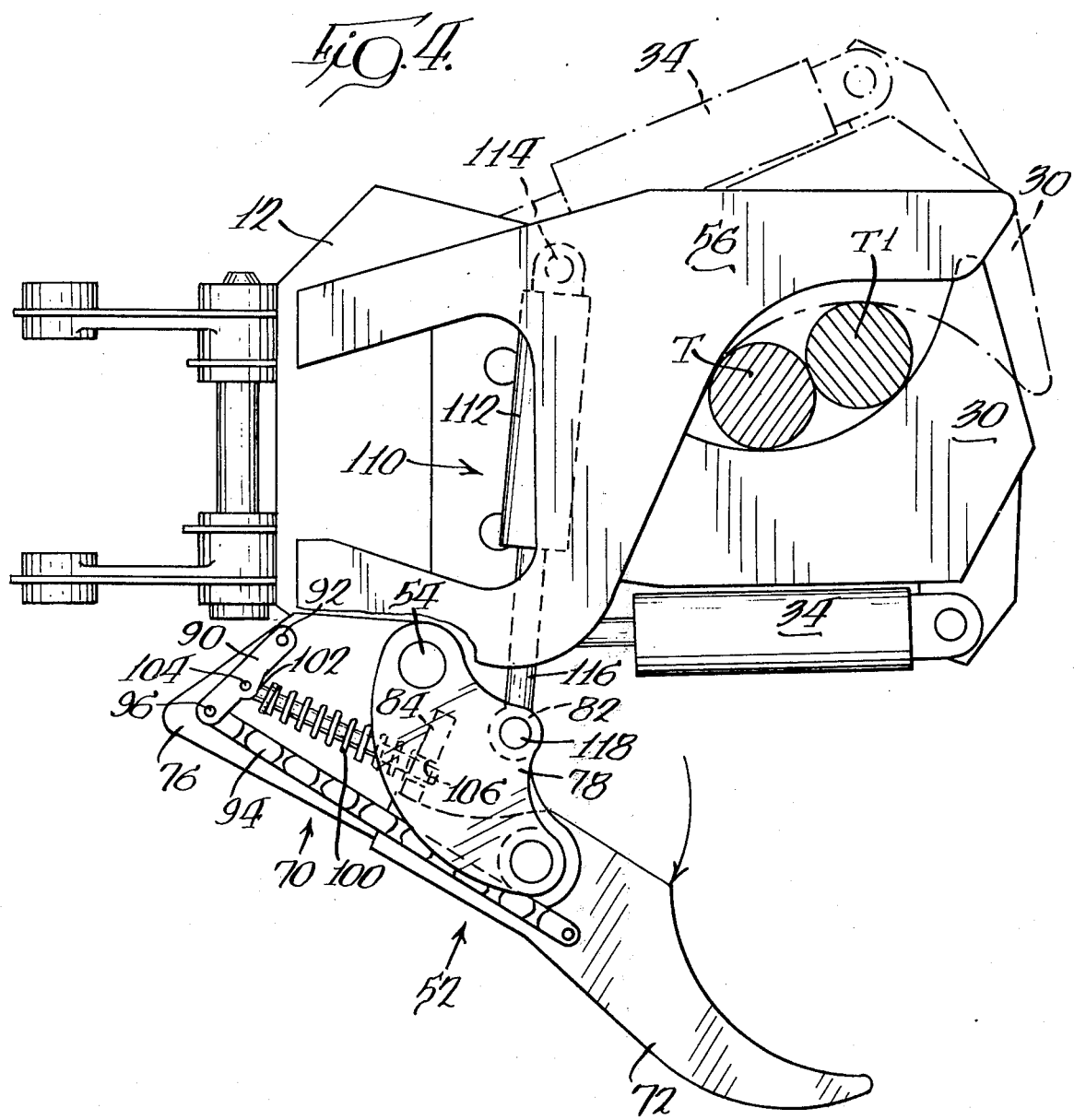

3,910,326

TREE HARVESTING APPARATUS WITH ACCUMULATOR MECHANISM

REFERENCE TO RELATED PATENTS

This application relates to an improvement for tree cutting apparatus of the type disclosed in U.S. Pat. No. 3,575,222, assigned to the assignee of the present invention.

BACKGROUND OF THE INVENTION

In recent years, numerous types of apparatus have been developed for felling trees. One type of mechanism or tree harvesting apparatus is disclosed in the above mentioned patent. The harvesting unit disclosed in this patent is capable of being attached to a conventional boom and dipper stick assembly for cutting standing timber. The unit consists of a grapple means supported on a frame and a tree cutting means also supported on the frame so that a standing tree may be grasped by the grapple means and severed adjacent the ground. The severed tree can then be manipulated to be deposited on the ground or on a trailer for ultimate transportation to a mill.

While this type of unit has been found to be extremely versatile, certain drawbacks have been noted. One of the problems that has been encountered is that, when harvesting small trees, it may not be expeditious to manipulate each individual tree for deposit on the ground or trailer. Thus, recent efforts have been devoted to providing improvements for a unit of this type which are capable of accumulating a plurality of individual trees on the support frame before the trees are deposited on the ground or a vehicle for further transportation.

One such unit for successively accumulating several trees on the tree lifting support frame is shown in Smith U.S. Pat. No. 3,805,860 issued Apr. 23, 1974. The accumulating mechanism disclosed in this patent consists of a pair of articulated finger parts that are individually moved by separate fluid rams to permit trees to be grouped on the support frame. While such a mechanism is capable of being incorporated into existing machinery of the type disclosed in the above mentioned Tucek patent, this mechanism consists of several parts, including two hydraulic cylinders, which add to the overall cost of the unit. Of even more importance is the fact that the tree accumulating mechanism disclosed in this patent requires an extremely versatile operator to manipulate the articualted fingers either to grip a severed tree or to "snake" the articulated finger parts from between two trees while they are being held by a main gripping mechanism.

A further problem encountered with the mechanism disclosed in the Smith patent is that the hydraulic circuitry requires separate control valves for controlling the respective fluid rams cooperating with the accumulator mechanism. In addition, these controls must be located in the cab for the vehicle which requires a substantial amount of additional flexible conduit between the cab and the support for the tree cutting apparatus.

Another type of accumulating mechanism is disclosed in Coffey U.S. Pat. No. 3,664,391. The accumulating mechanism disclosed in this patent consists of a pair of arms that are pivoted on the tree cutting apparatus support by a single fluid ram that is interposed between adjacent ends of the respective arms. Each of the two arms have opposite end portions which are pivoted on a base portion and are biased to a first position.

Again, this system for accumulating trees requires a completely separate hydraulic control circuit leading from the cab of the vehicle to the support in order for the operator to manipulate the hydraulic fluid ram associated with the particular tree accumulating mechanism.

SUMMARY OF THE INVENTION

According to the present invention, a simple tree accumulator means for accumulating a plurality of trees on a tree harvesting support apparatus is designed to readily be incorporated into existing harvesting apparatus with minimum modification. The tree accumulator means consists of a single gripping member that is located intermediate two vertically spaced tree engaging elements on a support and the gripping member is moved between first and second positions by a single fluid ram located between the support and the gripping members. Also, the gripping member consists of two pivotally interconnected portions which are normally held in substantially end-to-end relation by a specific type of biasing means which accommodates relative pivotal movement between the two portions so that the outer end portion may be moved from between two adjacent trees on the support means while they are being gripped by primary grapple means.

According to another aspect of the invention, the hydraulic circuit for the single fluid ram cooperating with the tree accumulator means consists of branch conduits that lead from the main hydraulic circuit for the grapple means and the branch conduits have a remotely controlled solenoid valve located therein which can be electrically controlled by the operator in a remotely located cab. This arrangement substantially simplifies the hydraulic circuitry required for operating the tree accumulator means.

BRIEF DESCRIPTION OF THE SEVERAL VIEWS OF THE DRAWINGS

FIG. 1 shows a fragmentary view of a tree harvesting machine with certain portions of the vehicle and the boom being deleted for simplicity;

FIG. 2 is an enlarged fragmentary view as viewed along line 2—2 of FIG. 1;

FIG. 3 is a view similar to FIG. 2 showing the accumulator apparatus being manipulated during the accumulation of trees on the main support;

FIG. 4 is a view similar to FIG. 3, showing the accumulator mechanism in an open position; and FIG. 5 is a schematic illustration of the hydraulic circuit for the accumulator mechanism in conjunction with the hydraulic circuit for the main tree harvesting mechanism.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a tree harvesting apparatus, generally designated by reference numeral 10.

The majority of harvesting apparatus 10 is substantially identical to that disclosed in Tucek U.S. Pat. No. 3,575,222 and portions of this patent not inconsistent with the present disclosure are incorporated herein by reference. Apparatus 10 consists of rigid support means 12 pivotally supported by a pin 14 on the outer end of a boom 16 which may be part of a mobile crane (not shown). Rigid support means 12 may be pivoted about pin 14 through a hydraulic fluid ram 18 interposed between the boom 16 and support 12. Tree harvesting apparatus or tree feller 10 consists of an upper grab arm assembly, generally designated by the reference numeral 20, an intermediate grab arm assembly, generally designated by the reference numeral 22, and a lower tree engaging and shearing assembly, generally designated by the reference numeral 24. Each of these assemblies may be identical in construction of that disclosed in the above mentioned Tucek patent and the detailed description of the various parts will be deleted for purposes of simplicity. Only the parts necessary to the understanding of the present invention will be described below.

Upper and intermediate grab arm assemblies 20 and 22 are substantially identical in construction and define the grapple means for grasping and holding a standing tree while it is being severed by shear assembly 24. Each grab arm assembly consists of an arm 30 pivotally supported by a pin 32 on rigid support means 12 by a hydraulic fluid ram 34. Arms 30 each have a concave inner periphery 36 for engagement with the normally circular periphery of the outer surface of a tree.

The tree cutter means or severing mechanism 24 again consists of a pair of arms 40 (only one being shown) that are pivotally supported on rigid support frame 12 and are moved by a single hydraulic ram 42 coupled to the arms through a pair of linkages 44 identical in construction to those described in the above mentioned Tucek patent. The details of the cutter mechanism and drive means for the cutter mechanism do not form a part of the present invention and thus have not been described in detail. However, for purposes of completeness, a cutting mechanism could be of the type disclosed in the above mentioned patent. This cutting mechanism also incorporates a rigid tree engaging member or element 46 of the type disclosed in the above patent.

The tree accumulator means of the present invention is preferably located between the upper and intermediate grapple arms 30 and cooperates with the grapple arms that define grapple means to accumulate a plurality of small trees on the rigid support means or frame 12. Tree accumulator means 50 consists of a single gripping member 52 (FIG. 2) that is pivotally supported by a pin 54 on rigid support means 12 and is located between or intermediate upper and lower tree engaging elements. In the illustrated embodiment, the lower tree engaging element consists of tree engaging element 46 that forms part of the cutter mechanism 24 and a second or upper tree engaging element 56 that is located adjacent the upper end of support means 12. Upper tree engaging element 56 may consist of upper and lower plates 58 that are interconnected by a cross plate 60 and the entire mechanism fixedly secured to support means 12, as by welding.

Upper tree engaging element or member 56 may again have the concave inner periphery 62 as shown in FIG. 2. In the embodiment illustrated, upper tree engaging element 56 is located above the grab arm assembly 20.

According to one aspect of the invention, the single tree gripping member 52 is designed to cooperate with upper and lower spaced rigid tree engaging elements 46 and 56 to accumulate a plurality of trees. Also, the single gripping member is capable of being manipulated by a single fluid ram.

Single tree gripping member 52 consists of a first portion 70 pivoted on pivot pin 54 and a second portion 72 pivoted on an adjacent free end of first portion 70 by a pivot pin 74. In the illustrated embodiment, first portion 70 of gripping member 52 consists of lower and upper plates 76 and 78 which are vertically spaced to define a space therebetween which receives outer portion 72. The spacing between lower and upper plates 76 and 78 may be maintained by a collar 80 which defines the opening for pivot pin 74 and a further collar 82 defining a further pivot axis that will be described later. Also, a fixed plate or stop 84 is located between plates 76 and 78 for a purpose that will be described later.

First and second portions 70, 72 of single gripping member 52 are normally held in end-to-end relation as shown in FIGS. 2 and 4 by biasing means 88 which will now be described. Biasing means 88 consists of an arm 90 that is pivotally supported at one end by pin 92 on first portion 70 more particularly lower plate 76. A flexible element 94 has one end secured to the outer end of arm 90 through a pin 96. The opposite end of flexible element 94, which may be a chain, is secured by a pin 98 to second portion 72 of single gripping member 52 at a location spaced from pivot point 74. Arm 90 is normally biased to a first position, shown in FIGS. 2 and 4 by spring means 100 consisting of a coil spring supported on a rod 102 (FIG. 4) pivotally connected at one end by pin 104 to an intermediate portion of arm 90 with the opposite end of rod 102 extending through an enlarged opening 106 in fixed plate 84. Thus, coil spring 100 engages plate 84 and an intermediate portion of arm 90 and normally maintains gripping member portions 70 and 72 in a substantially end-to-end relation, shown in FIG. 4 wherein the inner end of portion 72 engages plate or stop 84. Stated another way, plate 84 defines stop means on first portion 70 which is located in the pivotal path of movement of outer or second portion 72 so that coil spring 100 can normally maintain the fixed relation between the two portions of gripping member 52 in the position as shown in FIG. 4.

Single gripping member 52, including portions 70 and 72, is normally moved as a unit between clamped and released positions, respectively shown in FIGS. 2 and 4 by a single fluid ram 110 that is interposed between rigid support 12 and first portion 70. Fluid ram 110 consists of a cylinder 112 pivoted by pivot pin 114 on rigid support 12 and a piston rod 116 reciprocated in cylinder 112 and having an outer free end connected to first portion 70 through a pin 118 which extends through collar 82 described above.

Before describing the operation of tree accumulator gripping member 52, the novel hydraulic circuit forming a primary aspect of the present invention will be described. The hydraulic circuit for fluid ram 110 is incorporated into the existing hydraulic circuit for grab arm asemblies 20 and 22 as well as tree cutting mechanism 24 with a minimum amount of modification thereto. Before describing the circuitry for accumulator fluid ram 110, a description of the basic hydraulic circuit is necessary.

The basic hydraulic circuit for providing hydraulic fluid to the rams associated with grab arm assemblies 20 and 22 and cutting mechanism 24 is incorporated into the overall hydraulic control system that is schematically illustrated in FIG. 5. The hydraulic control system includes fluid rams 34 that define first hydraulic motor means that cooperate with the grapple means or grapple arms and second hydraulic motor means consisting of fluid motor 42 that cooperates with cutter means 24. The circuitry for supplying fluid to the first and second hydraulic motor means consists of the fluid reservoir 130 having a pump 132 connected thereto and first and second main conduits 134 and 136 respectively leading from the reservoir and the pump to the support means 12 (see FIG. 1). A three position valve or control valve means 140 is located in first and second main conduits 134 and 136 so as to selectively connect pump 132 and reservoir 130 to either of first main conduits 134 and 136. First main conduit 134 is connected directly to the head ends of the respective cylinders that form part of fluid rams 34 and 42. Likewise, second main conduit 136 is connected directly to the rod ends of the respective cylinders forming part of fluid rams 34 and 42.

With this arrangement, all three fluid rams 34 and 42 are simultaneously extended and the grapple means 20 and 22 will initially grasp the tree before the severing operation occurs because of the increased resistance to movement of the cutter blades associated with fluid ram 42.

The hydraulic circuit for supplying fluid to opposite ends of the cylinder 112 of fluid ram 110 is arranged so that the fluid that is delivered through either of the onduits 134 or 136 may be utilized to manipulate the movement of gripping member 52. As most clearly shown in FIG. 5, the hydraulic control system includes an auxiliary circuit 150 that leads from first and second main conduits 134 and 136 and is capable of independently controlling the movement of fluid ram 110 irrespective of the position of fluid rams 34 and 42 without the necessity of having separate conduits leading from reservoir 130 and pump 132 located adjacent the cab of the vehicle. More specifically, auxiliary circuit 150 consists of first and second branch conduits 152 and 154 that are connected to first and second main conduits 134 and 136 and respectively to opposite ends of cylinder 112 which forms part of the third hydraulic motor means 110 for moving the tree accumulator means or arm 52. A remotely controlled solenoid valve means 156 is located in branch conduits 152 and 154 and is normally biased to a first position illustrated in FIG. 5. According to one aspect of the invention, the remotely controlled solenoid valve 156 is a two position valve which has biasing means or spring 158 that normally biases solenoid valve means 156 to the first position illustrated in FIG. 5. Solenoid valve means 156 also has power means in the form of an electrically actuated solenoid 160 that, when energized, moves the valve to a second position.

According to one apsect of the invention, solenoid 160 is capable of being actuated from a location remote from support 12, namely in the cab of the vehicle, by actuation of a switch. This eliminates the need for any complicated hydraulic circuitry or electrical circuitry leading from the cab for the vehicle to or near the remotely located tree harvesting apparatus. More specifically, solenoid 160 receives its power source from a battery 162 that is located in the vehicle with a single wire leading from the battery to the remotely located solenoid 160 on or near the rigid support frame 12. A normally open switch 166 is located in the cab for the vehicle and, when closed, supplies power from battery 162 to solenoid 160 to move the solenoid from the illustrated position to a second position wherein the conduit connections to cylinder 112 are reversed.

The remainder of the auxiliary hydraulic circuit 150 consists of interconnecting means between the first and second branch conduits 152 and 154 with a plurality of unidirectional valve means in the first and second branch conduits and the interconnecting means which are arranged so that fluid under pressure is delivered from either main conduit to the third hydraulic means to move the accumulator means to the closed position when the solenoid valve is in the first position and to move the hydraulic motor means to the open position when the solenoid valve means is in the second position. More specifically, the first branch conduit 152 has a first unidirectional valve means 170 therein which prevents flow from cylinder 112 to first main conduit 134. Likewise, second branch conduit also has a unidirectional valve means 172 that restricts flow from second main conduit 136 towards solenoid valve 156.

The interconnecting means between the two branch conduits consists of a first branch line 178 connecting second branch conduit 154 to first branch conduit 152 with a unidirectional check valve 180 located therein. Also, a further branch line 184 is located between first branch conduit 152 and second branch conduit 154 and also has a further unidirectional valve 186 located therein. All of the unidirectional valves may be one-way check valves well known in the art.

The respective valves and interconnecting means are positioned so that the piston rod 116 of fluid ram 110 is always moved towards the closed position, that is to say that fluid under pressure is delivered to the rod end of cylinder 112 from either first main conduit 134 or second main conduit 136, whichever conduit may have pressurized fluid therein. This means that the hydraulic fluid motor 110 is always in a position corresponding to the closed or gripping position for arm 52 whenever solenoid valve means 156 is in the position illustrated in FIG. 5. However, if the operator should desire to open the accumulator arm or move accumulator arm to the second position, it is merely necessary for him to actuate button 166 which will energize solenoid 160 and automatically move solenoid valve means 156 to a second position wherein the conduit connections to fluid cylinder 112 are reversed. In this reversed position, the hydraulic fluid motor 110 will remain in an extended position which corresponds to the open position for the tree accumulator means or arm 52. When button or switch 166 is released, fluid ram 110 will automatically move to the retracted position.

The auxiliary circuit 150 also incorporates pressure responsive relief valve means 190 located between first and second branch conduits 152 and 154 and pressure responsive relief valve means 190 will interconnect conduits 152 and 154 when the pressure and conduit 152 exceeds a certain level as will be described later.

The hydraulic circuitry just described has the unique advantage in that all of the components and conduits for adding an accumulator gripping member and fluid ram to existing tree harvesting apparatus is located on or near the harvesting support frame. This eliminates the need for separate hydraulic conduits leading from a rigid support along the full length of the boom back tp the main vehicle. The only mechanism which needs to be positioned on the cab is the single wire or line 164 and switch 166 with the wire 164 leading from the control console or cab to solenoid 160.

OPERATION

The operation of the tree harvesting apparatus with the unique tree accumulator mechanism is believed to be understood from the above description but will be briefly summarized. Assuming that the operator wishes to cut several trees and accumulate them on rigid support 12, and assuming that the grapple arm 30 and accumulator arm 52 are in the position illustrated in FIG. 2, without any tree, the operator manipulates rigid support 12 to locate a first tree T to engage lower and upper fixed tree engaging elements 46 and 56. During this movement of the tree T to the position shown in FIG. 2, outer end portion 72 of the tree gripping arm 52 will be moved from the solid-line position to the dotted-line position shown in FIG. 2. Control valve 140 may then be operated to supply fluid under pressure to first main conduit 134, closing arms 30 to securely grasp a standing tree T. After the tree is securely grasped by arms 30, the pressure of the fluid in conduit 134 will rapidly increase because no fluid is being accepted by fluid rams or first hydraulic motor means 34 while pump 132 is still delivering fluid under pressure. At this point in time, the increase in the pressure of the fluid in conduit 134 will extend fluid ram 42 to sever tree T at its base.

While tree T is being severed and while it is being securely gripped by grab arms 30, switch 166 is actuated to energize solenoid 160 and move valve 156 to its second position so that fluid under pressure from first main conduit 134 will be delivered to the head end of cylinder 112 through first branch conduit 152 and check valve 170. This will pivot the first portion 70 of arm 52 about pivot pin 54 and will simultaneously cause second portion 72 of arm 52 to be pivoted about pivot pin 74. When the free outer end of arm portion 72 moves past tree T, biasing means 88 will immediately replace the two arm portions 70 and 72 to the end-to-end position shown in FIG. 4. The operator then releases button 166 allowing valve 156 to return to its first position illustrated in FIG. 5 so that pressurized fluid from first main conduit 134 is again delivered to the rod end of cylinder 112 to move gripping member 52 from the position shown in FIG. 4 to the solid-line position shown in FIG. 2. The movement of gripping member or arm 52 to the position shown in FIG. 2 will securely grasp tree T between lower and upper fixed elements 46 and 56 and arm portion 72.

The support member 12 may then be manipulated to position a second tree T1 adjacent fixed elements 46 and 56 and be clamped by grab arms 30. At this time, gripping member or arm 52 is still in the position shown in FIG. 2 so that the grab arm 30 forces the second tree T1 against the outer surface of second portion 72. The second tree is then severed as described above and, while still being gripped by grab arms 30, switch or button 166 is again actuated to extend fluid ram 110 and cause finger portion 72 to be moved from between the two trees T and T1 (see FIG. 3) while both of these trees are continuously being gripped by grab arms 30. This necessarily results since fluid pressure is continuously being supplied through first main conduit 134 to the extend ends of fluid rams 34.

This sequence of operations can be continued until a desired number of trees has been accumulated at which time all of trees are simultaneously deposited at a collection point for subsequent transportation to another site.

As can be appreciated from the above description, the present invention provides an extremely simple and inexpensive mechanism that can be incorporated into existing machinery for accumulating a plurality of trees. The unique arrangement has numerous advantages over any of the known prior art tree acccumulators. For example, the accumulator arm 52 will always be held in the first, closed position illustrated in FIG. 2 and, in this position, the tree harvesting mechanism can readily be utilized for harvesting and transporting individual large trees. During such use of the machine, each time a tree is placed in position for being gripped by grab arms 30, arm portion 72 will automatically pivot from the solid-line position to the dotted-line position shown in FIG. 2 and will not in any way interfere with the normal operation of the machine.

The unique hydraulic circuit for operating gripping member or arm 52 also has a minimum number of parts, all of which are supported directly on the rigid support 12 to eliminate the need for an excessive amount of conduit leading from the main fluid source located on the vehicle to the support. In addition, the circuitry with the plurality of check valves insures that the gripping member or arm 52 will at all times remain in the position illustrated in FIG. 2 regardless of the position or movement of grab arms 30.

While the particular embodiment of the invention envisions the use of a separate fixed tree engaging element 56, in certain instances it may be desirable to eliminate such fixed elements and rely upon upper grab arm assembly 20 and particularly grab arm 30 as the upper fixed element. For example, the upper grab arm 30 could be held in a fixed closed position illustrated in phantom line in FIGS. 3 and 4 and act as the upper tree engaging elemennt for the tree accumulating process. This could readily be accomplished by placing valves in the lines adjacent opposite ends of the fluid ram 34 associated with upper grab arm 30 to trap fluid in the ram 34 while it is in the extended position illustrated in FIG. 3.

It will also be appreciated that various other types of cutter mechanisms or grapple assemblies may be substituted for those described above.

What is claimed is:

1. In combination with a tree harvesting apparatus including support means adapted to be supported on the outer end of a boom, grapple means on said support mean for grasping a standing tree, cutter means on said support means for severing said standing tree, and tree accumulator means pivotally supported on said support means for accumulating a plurality of trees on said support means, a hydraulic control system for said apparatus, said control system including first hydraulic motor means cooperating with said grapple means, second hydraulic motor means cooperating with said cutter means, third hydraulic motor means cooperating with said accumulator means, a fluid reservoir, a pump connected to said reservoir for supplying fluid under pressure, first and second main conduits respectively leading from said reservoir and said pump to said support means and connected directly to said first and second hydraulic motor means, control valve means in said first and second main conduits remote from said support means, first and second branch conduits connected to said third hydraulic motor means to said first and second main conduits adjacent said support means, and remotely controlled solenoid valve means adjacent said support in said first and second branch conduits for controlling flow between said main conduits and said third hydraulic motor means.

2. The combination as defined in claim 1, in which said remotely controlled solenoid valve means is a two position valve with biasing means normally biasing said valve to a first position and power means maintaining said solenoid valve means in a second position.

3. The combination as defined in claim 2, in which said accumulator means has an open position and a closed position, further including interconnecting means between said first and second branch conduits, and a plurality of unidirectional valve means in said first and second branch conduits and interconnecting means, said unidirectional valve means being arranged so that (1) fluid under pressure is delivered from either main conduit to said third hydraulic motor means to close said accumulator means when said solenoid valve means is in said first position and (2) fluid under pressure is delivered from either main conduit to said third hydraulic motor means to open said accumulator means when said solenoid valve means is in said second position.

4. The combination as defined in claim 3, in which said first, second and third hydraulic motor means each include a cylinder and a piston rod extensible and retractable relative to said cylinder.

5. The combination as defined in claim 3, further including pressure responsive relief valve means between said first and second branch conduits.

6. The combination as defined in claim 1, in which said tree accumulator means includes spaced rigid tree engaging elements fixed to said support means and positioned to engage a tree at vertically spaced locations thereon, a single gripping member supported on said support means intermediate said spaced engaging elements, said gripping member including a first portion having one end pivotally supported on said support means, a second portion pivoted on an adjacent free end of said first portion, biasing means normally maintaining said portions in end-to-end relation, said biasing means accommodating relative pivotal movement between said portions when movement of said second portion is impeded by a tree, and in which said third hydraulic motor means is located between said first portion and said support means for moving said portions as a unit between clamped and released positions.

7. The combination as defined in claim 6, in which said grapple means includes first and second grapple arms respectively pivoted on said support means at vertically spaced locations and adapted to engage opposite sides of said tree.

8. Tree harvesting apparatus for use at the end of a boom movably supported on a vehicle comprising elongated rigid support means, grapple means pivotally supported on said support means for grasping and securely holding a standing tree, tree cutting means adjacent one end of said support means for severing a tree while being grasped by said grapple means, and tree accumulator means for accumulating a plurality of trees on said support means, the improvement of said tree accumulator means including spaced rigid tree engaging elements fixed to said support means and positioned to engage a tree at vertically spaced locations thereon, a single gripping member supported on said support means intermediate said spaced engaging elements, said gripping member including a first portion having one end pivotally supported on said support means, a second portion pivoted on an adjacent free end of said first portion, biasing means normally maintaining said portions in end-to-end relation, and drive means between said first portion and said support means for moving said portions as a unit between clamped and released positions, said biasing means accommodating relative pivotal movement between said portions when movement of said second portion is impeded by a tree.

9. Tree harvesting apparatus as defined in claim 8, in which said biasing means includes an arm pivotally supported on said first portion, a flexible element having one end connected to a free end of said arm and an opposite end connected to said second portion at a location spaced from the pivotal connection between said portions, and spring means between said arm and said first portion.

10. Tree harvesting apparatus as defined in claim 9, further including stop means on said first portion and located in the pivotal path of movement of said second portion, said stop means defining the end-to-end relation between said portions.

* * * * *